United States Patent Office 3,175,931
Patented Mar. 30, 1965

3,175,931
TREATMENT OF ALUMINUM SURFACES
Carl A. Burgess, Kennewick, and John D. Schaffer, Richland, Wash., assignors to the United States of America as represented by the United States Atomic Energy Commission
No Drawing. Filed Nov. 26, 1963, Ser. No. 326,302
5 Claims. (Cl. 148—6.15)

This invention deals with a process of preparing metal surfaces to make them nonwettable by molten aluminum-silicon alloys and in particular with a process of treating aluminum or the like cans or jackets of nuclear uranium fuel elements.

Uranium fuel elements for nuclear reactors are usually protected against corrosion and other undesirable reactions by enclosing them in a can or jacket made of an aluminum-base metal, such as aluminum or aluminum alloy. In order to improve this protective effect and also the heat conductivity of the fuel element, the jacket is bonded or brazed to the core with an aluminum-silicon alloy, preferably of eutectic composition. The jacket or can, in turn, is advantageously protected against damage by handling, etc. by surrounding it with a snugly fitting steel sleeve.

This brazing alloy is customarily applied to the space formed between jacket and core by immersing the core-jacket-sleeve assembly into molten aluminum-silicon eutectic. This method, however, has the drawback that the aluminum-silicon alloy also fills the inter-space between the outside of the can and the steel sleeve, and that the aluminum-silicon alloy then corrodes the aluminum can. Grooves and protrusions have been machined at one end of the aluminum can, but they were found not completely to prevent the entry of the aluminum-silicon alloy and not with sufficient reliability.

It was found that treatment of the surfaces that are not to be wetted by the brazing alloy with an aqueous solution of alkali metal metasilicate, e.g. $Na_2SiO_3$, followed by drying makes the surfaces repellant to, and non-wettable by, molten aluminum-silicon alloys. A small content of trialkali orthophosphate in the metasilicate solution improves this effect considerably.

The concentration best suitable for the antiwetting solution is from 20 to 24 oz./gal. of alkali metasilicate and optionally also from 12 to 16 oz./gal. of trialkali orthophosphate. These salts can be dissolved in tap water, but water from which aluminum and irons ions have been removed is preferred. The solution can be applied to the surface by customary means, such as by brushing, spraying and immersing. The solution is preferably used at room temperature; and coating formed is allowed to air-dry, or it is oven-dried below about 100° C.

Example

Two assemblies were made, each consisting of a core of uranium metal, a can of pure aluminum therearound and a snugly fitting stainless steel sleeve around the can. The assemblies were identical with the exception that the aluminum can of one of them had been sprayed on the outside with an aqueous solution containing 22 oz./gal. of sodium metasilicate and 14 oz./gal. of trisodium orthophosphate and the coating formed had been allowed to dry.

Both assemblies were immersed in molten aluminum-silicon eutectic (about 12% by weight of silicon). After removal of the assemblies from the eutectic and cooling for solidification, both units were examined for the aluminum-silicon content in the space between aluminum can and steel sleeve. It was found that the assembly which had not been treated with the antiwetting solution had numerous, irregularly thick deposits in the interspace around the aluminum can, while the unit treated with the metasilicate-phosphate solution was entirely free from such deposits on the outside of the can.

It will be understood that while the invention has been primarily described as applied to aluminum-canned uranium fuel elements, it is also suitable for other articles made of aluminum metal or alloys, and it will also be understood that otherwise the invention is not to be limited to the details given herein but that it may be modified within the scope of the appended claims.

The embodiments of the invention in which an exclusive property or privilege is claimed are defined as follows:

1. A process of treating surfaces of articles of aluminum-base metal to make them nonwettable by molten aluminum-silicon alloys, comprising applying a coating consisting essentially of an aqueous solution of alkali metasilicate to such surfaces, said solution containing equimolar quantities of alkali metal oxide and silica in a concentration of 20–24 ounces of the metasilicate per gallon of water; and drying the coating.

2. The process of claim 1 wherein the solution also contains trialkali orthophosphate.

3. The process of claim 2 wherein both metasilicate and othophosphate are the sodium salts.

4. The process of claim 3 wherein the solution contains from 12 to 16 ounces per gallon of trisodium orthophosphate.

5. A solution for the surface treatment of aluminum-base metal to prevent wetting by molten aluminum-silicon alloy, said solution consisting essentially of from 20 to 24 ounces per gallon of alkali metal metasilicate consisting of equimolar quantities of alkali metal oxide and silica and from 12 to 16 ounces per gallon of trialkali metal orthophosphate.

References Cited by the Examiner
UNITED STATES PATENTS

| | | | |
|---|---|---|---|
| 2,230,319 | 2/41 | Bochum | 148—6.15 |
| 2,426,988 | 9/47 | Dean | 106—38.27 |
| 2,481,977 | 9/49 | Cinamon | 148—6.15 |
| 2,499,729 | 3/50 | Daussan | 106—38.27 |
| 2,678,875 | 5/54 | Spooner | 106—74 |
| 2,895,838 | 7/59 | Ilenda | 106—38.3 |
| 2,989,418 | 6/61 | Harbaugh | 106—74 |
| 3,035,318 | 5/62 | Campbell | 106—74 |
| 3,104,993 | 9/63 | Sievert | 148—6.15 |

FOREIGN PATENTS

| | | |
|---|---|---|
| 464,967 | 4/37 | Great Britain. |

TOBIAS E. LEVOW, *Primary Examiner.*